United States Patent [19]

Hinsley

[11] Patent Number: 5,930,511
[45] Date of Patent: *Jul. 27, 1999

[54] OPERATING SYSTEM FOR USE WITH COMPUTER NETWORKS INCORPORATING ONE OR MORE DATA PROCESSORS LINKED TOGETHER FOR PARALLEL PROCESSING AND INCORPORATING IMPROVED DYNAMIC BINDING AND/OR LOAD-SHARING TECHNIQUES

[75] Inventor: Christopher Andrew Hinsley, Bracknell, United Kingdom

[73] Assignee: Tao Group Limited, Reading, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/424,367

[22] PCT Filed: Jul. 1, 1993

[86] PCT No.: PCT/GB93/01382

§ 371 Date: Jun. 21, 1995

§ 102(e) Date: Jun. 21, 1995

[87] PCT Pub. No.: WO94/10628

PCT Pub. Date: May 11, 1994

[30] Foreign Application Priority Data

Oct. 30, 1992 [GB] United Kingdom ............. 9222799

[51] Int. Cl.[6] ...................................... G06F 9/45
[52] U.S. Cl. ..................... 395/710; 395/711; 395/705
[58] Field of Search ........................... 395/650, 700, 395/675, 705, 706, 710, 711, 707

[56] References Cited

U.S. PATENT DOCUMENTS 5,276,881  1/1994  Chan et al. .......................... 395/707

FOREIGN PATENT DOCUMENTS

| 0 336 552 A2 | 10/1989 | European Pat. Off. . |
| 0483 970 A1 | 5/1992 | European Pat. Off. . |
| 0 540 151 A2 | 5/1993 | European Pat. Off. . |
| 0 547 759 A2 | 6/1993 | European Pat. Off. . |
| 2128782 | 5/1984 | United Kingdom . |
| 2242293 | 9/1991 | United Kingdom . |
| 2258068 | 1/1993 | United Kingdom . |
| 93/04426 | 3/1993 | WIPO . |

OTHER PUBLICATIONS

*Journal: Software–Practice and Experience*, vol. 21, No. 4, pp. 375–90, Apr. 1991, Inspec Abstract No. C91047904, W.W. Ho et al., "An approach to genuine dynamic linking".

Proceedings of the Summer 1988 Usenix Conference, Jun. 21–24, 1988, San Francisco, California, Inspec Abstract No. C88058289, S. Kaufer et al., "Saber –C: an interpreter-–based programming environment for the C language".

*Byte*, vol. 13, No. 4, pp. 227–33, Apr. 1988, Inspec Abstract No. C88035583, V. Heller, "OS/2 virtual memory management".

Usenix Association Summer Conference Proceedings 1985, Jun. 11–14, 1985, Portland, Oregon, Inspec Abstract No. C86029969, M.L. Kazar, "Camphor: a programming environment for extensible systems".

(List continued on next page.)

*Primary Examiner*—Majid A. Banankhah
*Attorney, Agent, or Firm*—Nixon & Vanderhye P.C.

[57] ABSTRACT

A data processing system is disclosed incorporating one or more processors linked together in a network and capable of parallel processing using a plurality of individual code segments common to all the data processors in the system but written for a virtual processor in a virtual processor code language which is different from that of all the data processors in the system. The code segments form unique autonomous tools common to all the processors in the system and are selected, translated and bound into a complete executable task by each individual processor at the time of loading or execution of a task by the respective processor.

19 Claims, 3 Drawing Sheets

OTHER PUBLICATIONS

*IEEE Transactions on Computers*, vol.38, No. 8, Aug. 1989, pp. 1124–1142, Frank C.H. Lin et al., "Gradient Model: A Demand–Driven Load Balancing Scheme".

Proceedings of the 6th International Conference on Distributed Computing Systems, May 1986, [R2], pp. 329–336, Kang G. Shin et al., "Load Sharing in Distributed Real–Time Systems with State–Change Broadcasts".

"Execution of Parallel Loops on Parallel Processor Systems" Polychronopoulos et al, IEEE 1986, pp. 519–527.

OPERATING SYSTEM FOR USE WITH COMPUTER NETWORKS INCORPORATING ONE OR MORE DATA PROCESSORS LINKED TOGETHER FOR PARALLEL PROCESSING AND INCORPORATING IMPROVED DYNAMIC BINDING AND/OR LOAD-SHARING TECHNIQUES

This invention relates to a data processing system and to an operating system for operating the data Processing system. In particular, the invention relates to an operating system for a computer.

In order to function, a computer or computer system employs hardware, such as one or more processors, input/output means, memory and various peripheral devices, and software in the form of both operating programs to cause the hardware to perform in a certain manner and higher level programs which instruct the operating programs to perform operations. Many operating systems have been designed in attempts to obtain the best possible performance From the various processors available. Many of these operating systems are unique to one particular processor. Furthermore, they may only support one or a small number of processing languages.

The present invention arose in the design of an improved computer and computer operating system. According to the present invention there is provided a data processing system comprising a plurality of data processors interconnected as nodes in a network. The network performs processes in such a manner that; a first node, upon receiving an instruction to perform a process decides whether it, or a neighbouring node, is best adapted, at that time, to perform the process and to select on the basis of that decision whether it or a particular neighbouring processor should perform the process.

In one embodiment the first node may send a message to each adjacent node indicative of the processing space required to execute the process; the first node also determining itself whether it has sufficient remaining space, each adjacent node being arranged to reply to the first node with information indicative of whether the space is available, wherein the first node compares the replies with its own determination and passes the process to the node having the most space available, or takes the process itself.

Alternatively, the node with the higher 'power rating' is selected, the power rating being the effective operations per second rating of the node divided by the number of processes running at the node multiplied by a function of the off chip communication speed available to the node. Other methods and schemes of making the decision may be used.

According to the present invention in a second aspect there is provided a data processing system including one or more data processors, a plurality of code segments, and means for binding a plurality of chosen code segments into an executable task to be Performed by one or more processors, wherein the individual code segments are bound into a complete executable task only at the time of loading or executing the task.

Embodiments of the invention will now be described, by way of example only, with reference to the accompanying drawings, in which.

The following description is of a computing network having a plurality of processors, which may be arranged either in the same vicinity, perhaps on the same wafer or chip, or spread out in a network linked by hard wiring, optical fibres, longer distance telecommunication lines, or by any other means. The system described is sufficiently flexible that any of these configurations and others besides, are appropriate. The system may alternatively include just one processor. The processor or processors are arranged to perform operations, programs and processes under the control of an operating system. The operating system enables programs to be written for an imaginary processor, known as a virtual processor, which has its own predefined language. This virtual processor enables any type of target processor to be used, or combinations of different types of processor, since the program code written for the virtual processor is only translated at load time into the native code of each processor. Thus, executable files can be transferred to any supported processor without modification or recompilation. Typical processors which are suitable for the system include the Inmos T800 Transputer, Motorola 680X0, Intel 80386/80486, TM534C40 Archimedes ARM and SUN SPARC. Other processors are of course suitable. The operating system is adapted for parallel processing such that more than one operation may be conducted simultaneously, as opposed to conventional computing systems which must pipeline data and operation so that only one operation can be performed at any one time. Multi-tasking and multi-user capabilities are also included.

The system is data flow-driven and essentially involves a plurality of code segments or tools, which are bound into a complete executable task only at the time of loading. Thus, each of these tools can be very short and, in themselves, almost trivial in their simplicity. For comparison, it should be noted that traditional commuting binds routines such as libraries, functions, and so on just after the compile stage in a process known as linking. The resulting file is a large, bulky, complete self-contained executable image requiring very little modification at load time. The file is not portable across processors and cannot easily adapt to changing components such as systems with small memory capacities. Furthermore, the component parts thereof cannot be reused for other tasks or indeed changed at all. The small components used in the present invention, which are only brought together to form an operation at the last minute (a just in time process) are of course completely portable and may also be shared between two or more processes at the same time, even though the processes are performing different jobs. Some tools are designed for a particular application and others are designed without any particular application in mind. With the late binding process, program components can also be bound during execution. Thus, large applications having a (nominally) large capacity can in fact run in a small memory capacity system and the application can choose to have available in memory only that particular code segment or segments required at any one time, as is described below.

Figure 1:
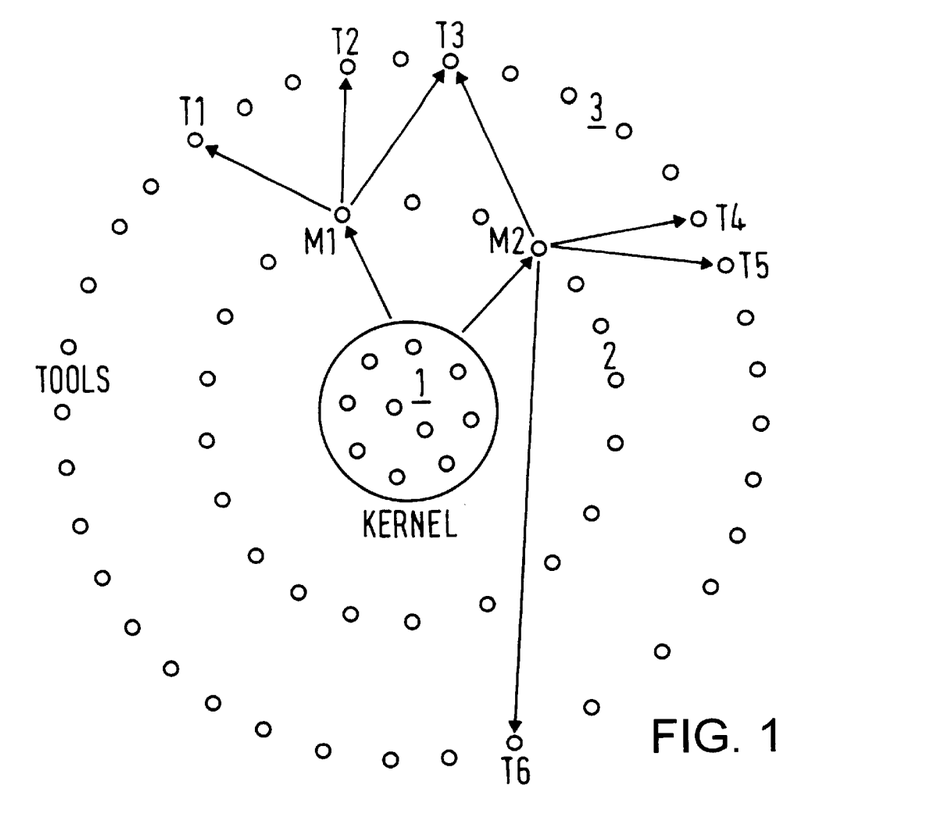
FIG. 1 shows schematically the program organisation of a computer system.

Data in the system is passed in the form of messages between code components. A code component which is capable of receiving and sending messages is known as a process and consists of a collection of tools and the binding logic for these and the data being processed. The system is illustrated schematically in FIG. 1 in which there is shown a central kernel of program code. The kernel is one 'block' and is the basic operating system which is used by all the processors in the network. Typically, it is of 8 to 16 kilobytes. Schematically illustrated outside the kernel are a plurality of tool objects 2, any collection which can form a process. A third level of program code is given by the tools 3. A typical process is shown by the arrows in the figure. Thus, a process which we shall call P1 comprises the kernel code 1 plus two tool objects M1 and M2. Each of these tool objects, which may be of only a few hundred bytes long, can utilise one or more of the tools 3. In this case, tool object M1 utilises tools T1, T2 and T3 and tool object M2 utilises T3 (again), T4, T5 and T6. It is thus seen from the figure that a relatively complex process or program can be performed by using a plurality of the relatively small segments, which are brought together only when necessary. More than one process can be performed simultaneously by placing each process upon a different processor. The actual placement of processes occurs by an automatic method outlined below, which method is transparent to the user, and indeed, to the system as a whole. Thus, optimum load balancing and communications efficiency is ensured. As a result of this, a number of processes that communicate can be automatically run in parallel.

Figure 2:
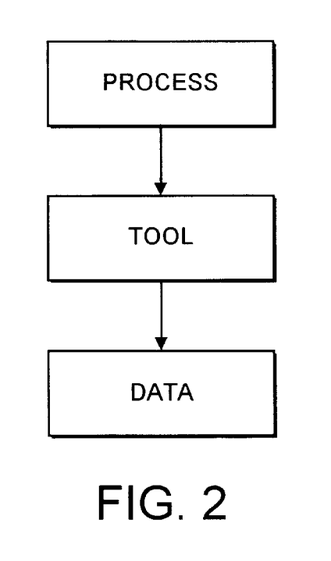
FIG. 2 shows the hierarchy of the organisation of FIG. 1.

The three fundamental component objects of the system are shown in FIG. 2. These comprise data objects, tool objects (tools) and process objects. A process object acts as a harness to call various tool objects. A process essentially directs the logic flow of an activity and directs tool objects to act on data. Thus, a process object is at the top of the hierarchical structure shown in FIG. 2. A tool object corresponds to a traditional functional call or sub-routine. It can only be used by reference and must be activated by something else such as a process object. This is similar to the manner in which a function in C language is called by a main body of code, the important distinction being that in the present system each code segment, ie tool, is completely independent. Finally, a data object corresponds to a data file. A data file may contain information about itself and about how it can be processed. This information can comprise, for example, information that points to the tool used to manipulate the data structure and local data relating to this file. A process can have a publicly defined input and output, such as an ASCII data stream. The process can thus be used by third party processes, ie not only by the author. A process that is not publicly available will have a private input and output structure and thus is only free for use by the author of a particular program, unless details of the input/output interface are made publicly available. One or more processes may combine to form an application which is a complete job of work. It should be noted that an application can run on two or more processors.

Figure 5:
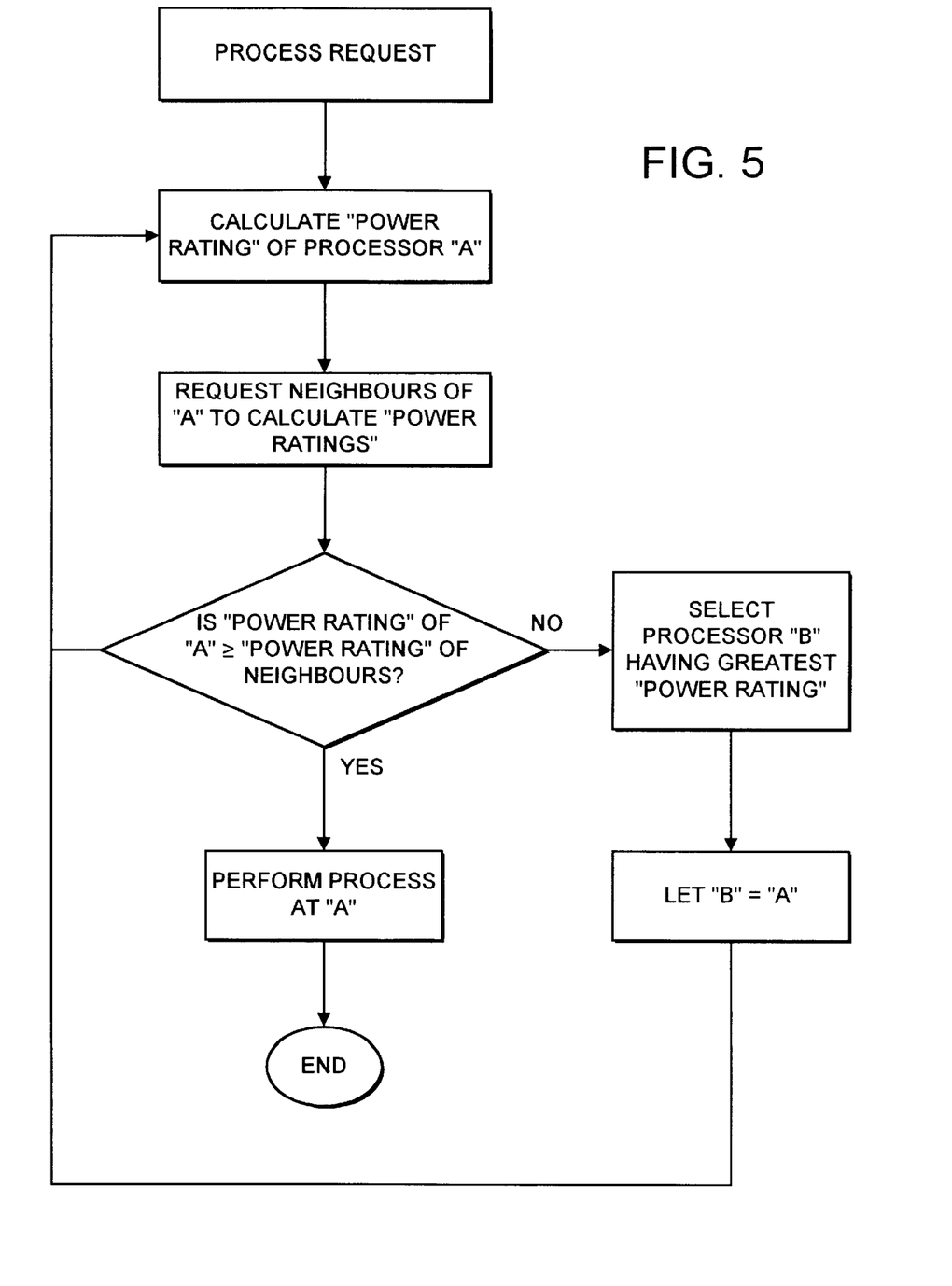
FIG. 5 shows a schematic flow chart for process allocation.

As described above, applications can be multi-tasked and/or parallel processed. Processes can activate other, child, processes which can themselves activate child (grandchild) processes, and so on. These processes are distributed through the available network of processors dynamically, and without the application or the programmer knowing the actual distribution. Communication between processes is based on a parent-child hierarchy. There are no "master" nodes or processors as such and any arbitrary topology of any number of processors may be used. FIG. 5 shows one possible algorithm for distributing processes between different processors in the network.

When a parent process wishes to co-process with a child process the message is firstly passed to a first processor, and in particular to the kernel process on that processor. This process handles messages to and from the processor and acts as a process control/message switcher. The kernel of the first processor, designated "A" then calculates the "power rating" of the processor. The power rating is essentially a measure of the capacity or space within that processor to perform that particular process. The power rating may be defined as being the effective operations per second rating of the processor divided by the number of processes running on that processor multiplied by a function of the off chip communications speed available to it. Other methods of determining a power rating may of course be used. For instance, a message to perform a particular process will be accompanied by the number of bytes required by the process. Thus the power rating may comprise determining whether that number of bytes are available within the processor's local memory. This memory may be an on-chip memory for a processor such as a transputer, or may be off-chip.

The local kernel then instructs the kernel of every neighbouring processor in the network (remembering that by neighbouring is meant topologically neighbouring and that physically the processors may be a large distance apart) to calculate their own power ratings. Each of the neighbouring processors then sends a message back to the parent processor A indicative of the respective power rating. The kernel of A then compares all of the power ratings and decides if its own power rating is greater than or equal to that of its neighbours. If so then the kernel of A decides to accept the process itself. It does this by instructing its own dynamic binder and translator (see below) to install the child, then sends a message to the instructing processor informing it of the unique mail box address on the receiving processor. If the power rating of processor A is not greater than or equal to that of its neighbours then whichever processor has the greatest power rating is chosen to accept the process. If all power ratings are equal, then processor A will accept the process. If the process is allocated to another processor then processor A sends a message to that processor saying "take X Bytes, process name, parent mail box no.".

Having found a Processor to take the child process, the process allocation dynamics could stop and the process could be performed. However, it is more usual to repeat the same allocation sequence from the new processor, ie, in the flow chart shown in FIG. 5, the new processor chosen, processor B, becomes processor A and the cycle starts again from the step of requesting the neighbours to calculate their power ratings. Thus, the search for a local processor having the minimum current activity and thus greatest capacity to perform a process automatically tends to flood out from a centre point which is the originating master parent. This substantially guarantees load balancing between the network of processors and local communications between tightly bound processes. Furthermore, it is seen from the above that no master node is required and in any network any one processor will usually have no more than one process more than any neighbour to perform at any time, if identical types. Alternatively, in some embodiments the user can, if desired, select which processor or type of processor can perform a process. For instance, if the network contains two types of processor, one of these types may be better adapted to perform a particular process, dependent upon memory capacity, for example. The user can then specify that this process is to be performed by a particular type of processor. It is also seen that the process, and therefore the programmer, has no requirement to know exactly where it is in the network. A message can carry either data or code between processors, allowing messages to be in the form of runnable code.

In an alternative embodiment, the processors may continually pass information relating to their "power rating"

between each other. This may be passed as embedded information in messages passed during the normal course of communication or, during periods when no other messages are being passed between processors, a specific exchange of power rating information only may occur, thus using unused communication time most efficiently. Each processor can then be provided with a look-up table, for example, which gives the status of its immediate neighbouring processors and its own immediate status. The power rating information may, for example, be passed in the form of one or a few bytes at the end or beginning of each ordinary message passed between processors. In this embodiment, when receiving a request to perform a process, a processor can immediately determine whether or not to take the process itself or to pass it to a neighbouring processor, and will know which one. Having determined to pass on a request to a neighbouring processor, the request is sent and the receiving processor then starts the decision process again until such a time as a Processor determines that at is best adapted to perform the process itself.

A process can be in one of five distinct states, these are 1. actively processing
2. waiting for input
3. withdrawing
4. inactive
5. asleep.

States 1 and 2 require no comment. State 3 occurs when a process has received a command to withdraw. In this state a process performs any activity which is necessary to become inactive. This can include, for example, processing urgent mail, sending withdraw messages to all of its child processes, if any and generally preparing for a convenient state in which it can go inactive. If the process forms the top level of an application then it will often save its exact current state as a message in a disk file. State 4 represents a process that is effectively terminated. In traditional systems, this would mean that the process in memory would cease to exist and its memory space would be cleared for subsequent use. In the system according to the present invention, however, the process is marked as inactive but is not removed unless and until its memory space is actually required. Thus, if another process in the same local processor references an inactive process in state 4 it can immediately go to state 2. State 5 is that state of a process when it is in permanent store such as on disk or other storage medium. When a process is inactive in state 4 and its memory space is required for another process, then that process goes from state 4 to state 5, ie is stored on disk and removed from the local processor's memory. When a process which is in state 5 is required for a particular local processor, that process is loaded from permanent store. Mail may then be available for the processor which mail is taken from three sources either from the process' state on disk, or from the process' own header, ie information forming part of the process, or mail from the parent process which caused the process to be loaded in the first place. This can cause the process to transit from state 4 to state 2 and then to state 1.

The term "disk" introduced above, refers to a device containing a collection of data objects "files" stored on a physical storage medium.

As described, all processes are automatically given mailbox facilities and can read and send mail to any other process having a known mailing address. This process could be, for example, a child process, the parent of the process, any named resource, for example a disk drive or a display, any inactive process whose full storage address is known or any other process having a known mailbox address. If an active process sends mail to an inactive process the mail may cause the inactive process to be executed as a child process or the mail may be stored until the target process is awake.

A message passed between two active processes may take the following structure:

bits Description

32 Message length in bytes

32 Message Type Mask—type of message, eg code, debugging information, error data 32 Message data offset—points to the start of message data and therefore allows for the fact that the DTM (see below) is not a fixed length 32 Next Destination Pointer (NDP)—signifies the address to which a reply should be directed 64 Originator Mailbox 64 Destination Target Mailbox (DTM)—list of process ID's 64 2nd DTM .. (more DTM's)

..

..

(xxx) message data

The message length is a byte count of the entire length of a message.

If the Next Destination Pointer points to a Destination Target Mailbox of "O" then no reply is required or expected. The array of onward destination mailboxes for messages does not imply that a particular message is to be forwarded. The existence of a valid DTM in the array signifies that a reply to a message should be forwarded to that process. In a simple case of a message requiring no reply the DTM array will contain three values, the originator process mailbox, the target process mailbox, then O. Attempting to send a message to the target ID O causes the message to be routed to the system mail manager. A message requiring a reply to the sender will have a DTM array consisting of four values: originator mailbox, destination mailbox, originators mailbox, O.

A pipe line of processes handling a stream of data will receive a DTM array which has (number of processes in the pipeline) + two elements, including the originators mailbox, plus the final destination as one of the processes in the pipe.

'Forked' pipe schemes are possible but require that a process actively creates the fork, with another process possible actively joining the fork later. Simple linear pipes need only reusable tool objects that operate in a similar fashion to Unix filters (as known to those skilled in the art) but can run in parallel and can be persistent in the network.

Forked and jointed messaging is automatically handled when programming using the shell with simple input-output filter tools.

Once in the memory space of a destination process the message structure has two further elements added before the message length:

bits Description

32 Forward link pointer

32 Backward link pointer

32 Message length in bytes

32 Message Type Mask etc

The forward and backward link point to other messages, if any, that make up the linked list of messages for a process's incoming mailbox.

Mail is read by a processor in two stages, first the size of the message, then the rest of the message into a buffer allocated dynamically for the message. This mechanism allows for a message to be redirected around a failed node or a kernel which is, for some reason, incapable of receiving a message.

Messages may be allowed to be distributed to more than one destination, by means of a mail group distributor. Any process which knows that it belongs to a group of processes can send a message to a mail group distributor declaring its group membership. Alternatively, a process can send a message to the mail group distributor which defines all its member processes. Once informed, the mail group distributor informs all member processes of the mailbox ID which is to be used for that group. Mail which is to be distributed to all members of the group is sent to the group mailbox and copies are sent to all members except the originator. A single process may belong to more than one mail group, and sub-groups may be provided. Private messages can also be sent between processes in a group without all other processes being aware.

The various types of tools are now described. Permanent tools form the core of the operating system. They are activated by the boot-up sequence and cannot then be disabled. Every processor always has a copy of each permanent tool available.

Semi-permanent tools are activated for every processor by the boot-up process. The user chooses which semi-permanent tools are activated. Once activated they cannot be deactivated.

Library tools are used as required from a named library of tools. Once activated, they remain cached in the memory of any processor that has run an application that references them, until memory constraints require their deactivation.

Application tools are either virtual or non-virtual. Virtual tools are not necessarily active when an application is running, but are activated as required when a process attempts to reference them. When not running, the virtual tool remains cached unless the memory space is otherwise required. Thus, automatic 'overlay' is available for tools in large applications that cannot fit into available memory. Non-virtual tools are loaded with an application and in active place before it executes. Thus, they are always available, and in memory during execution.

Each processor, or group of processors, in the network includes a permanent tool known as the dynamic binder and translator "DBAT". DBAT is in the native code of the processor, and thus a specific version of DBAT is required for each different supported processor. DBAT is capable of converting the virtual processing code into the native code of the processor. Each DBAT uses a list of tools. The list is a permanent and external tool list (PETL) which contains information about all permanent and semi-permanent tools (this list is identical for every node), and all external tools such as libraries which are currently referenced by the node, or previously referenced and still active, or inactive yet still available, for each individual node. On receiving a command to execute a message, the object is read into the local memory area of the process. The term processor may also include more than one processor which is connected in a network with one DBAT. A pass is made through the object. In that pass, DBAT adds tools to the PETL.

External tools are added to the PETL in the following way; if the tool is already in the PETL, it is accepted as available, or, if the tool does not exist in the PETL it is read in, and linked into the list of available tools. If this newly installed tool contains other tool references, DBAT deals with these recursively in the same way. DBAT continues until all external tools are available.

DBAT 'translates' the VP code of the process and newly installed tools to the target processor, inserting and correcting pointer information to tools inside the code. The unresolved virtual tool references are converted to a TRAP to the virtual tool handler insider DBAT, with a parameter pointing to the full pathname of the tool. On completion, DBAT allows the process to execute.

As each external tool is referenced by an incoming process, it has its usage flag incremented so that the tool has a value for the number of processes currently using it. As each process de-activates, the usage flag is decremented. When no process is using a tool, the tool has a usage value of zero, and can be de-activated by removal from the PETL and its memory released. This will only happen if memory space garbage collection occurs, allowing the system to cache tools. Semi permanent and permanent tools are installed by DBAT at boot up with an initial usage value of 1, thus ensuring that they cannot be de-activated. Virtual tools are called by a process while running. A virtual tool is referenced with a pointer to the tool's path and name, plus the tool's normal parameters.

The virtual tool handler in DBAT checks the PETL to see if the tool is already available. If so the tool is used as for a normal external tool. If it is absent DBAT activates the tool (the same process as for any external tool activated during a process start up) and then passes on the tool reference. This is entirely transparent with the exception that memory constraints may cause a fault if even garbage collection fails to find enough memory for the incoming tool. Virtual memory techniques can be used to guarantee this memory.

Figure 3:
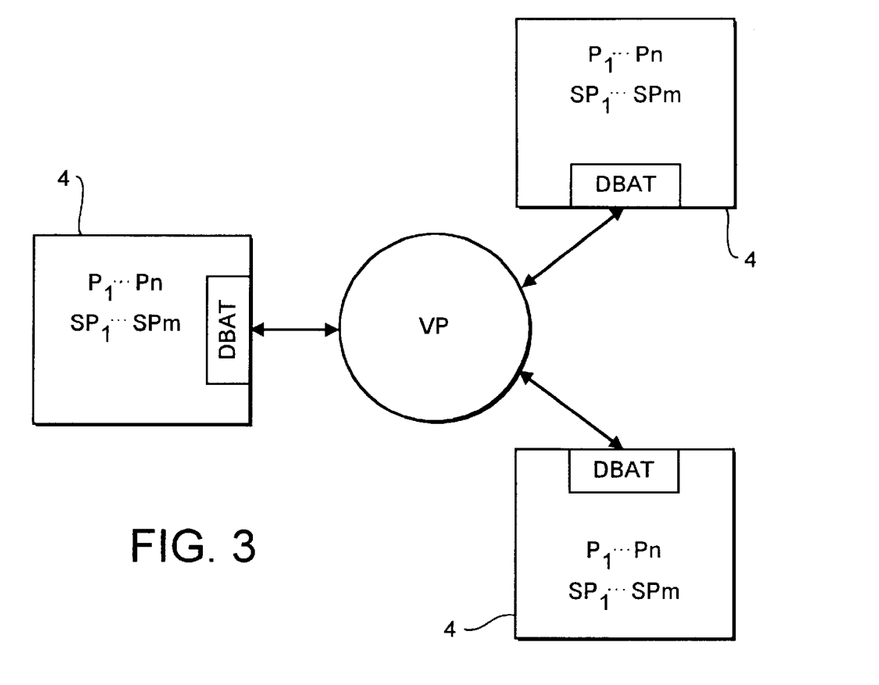
FIG. 3 shows the inter-relationship between a number of associated microprocessors during setting up of the computer system.
Figure 4:
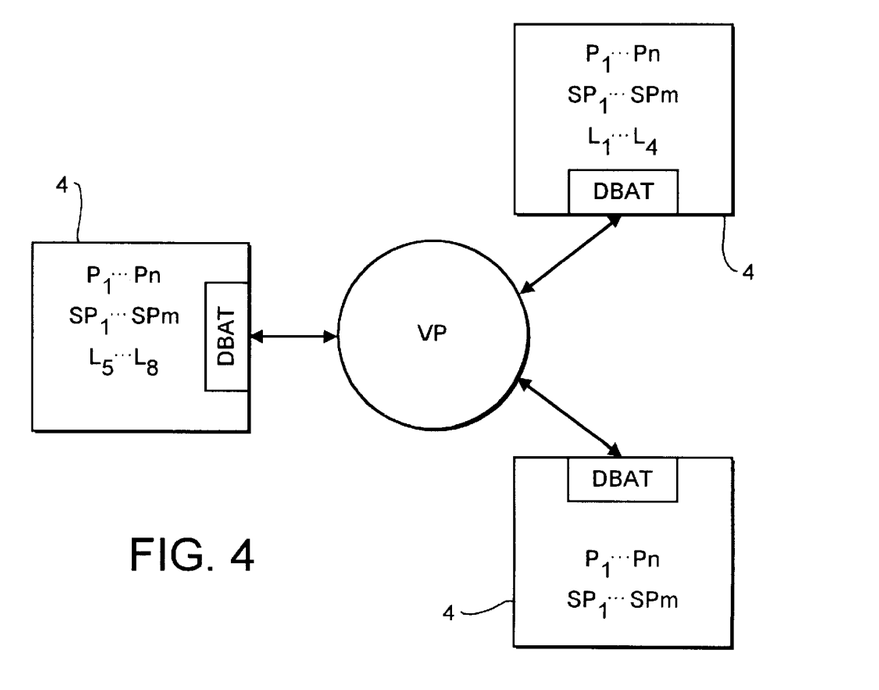
FIG. 4 shows the same relationship at a later stage during processing.

FIGS. 3 and 4 show, schematically, a system in operation. Three processors (or processor arrays) 4 are shown, schematically 'linked' to a central 'virtual' processor VP. It is assumed that each processor has a total memory, either on or off chip. At boot up, each Processor takes in DBAT and all the other permanent ($P_1 \ldots P_n$) and semi permanent tools ($SP_1 \ldots SP_m$). This state is shown in FIG. 3. All processors contain the same group of permanent and semi permanent tools.

FIG. 4 shows a later state. One processor has been instructed to perform a process which uses library tools $L_1$, $L_2$, $L_3$ and $L_4$. It therefore has read these in. In turn, this processor may read in various virtual or other tools as required to execute a particular process. Another processor has read in tools $L_5$, $L_6$, $L_7$ and $L_8$. The final processor is not, presently, performing any process. Two or more processors may, of course, use the same library function by reading a copy of it into local memory. Once a process has ended, the library tools remain cached in the respective local memories until needed again, or until garbage collection. Of course, several processes may be run simultaneously on any processor network as described above.

As well as handling the translation of VP code to native processor code, DBAT may, in some embodiments, recognise native processor coding. Using native coding prevents portability of code but is acceptable as a strategy for hardware specific tools (commonly drivers).

It should be noted that a process or tool may be coded either in VP code or native code, and mixed type tools may be used together. However VP and native code cannot usually be mixed within a single tool. A utility based in DBAT will accept VP code input and output native code for later running. This allows time critical application to be fully portable in VP 'source', but 'compiled' completely for a target system.

In order to help prevent unconstrained copying of applications, applications may retain the use of native coded tools ability keeping the original VP coding in house for the creation of different products based on specific processors. However, use of this feature prevents applications from running on parallel systems with mixed processor types.

It an externally referenced tool is not available then an error may be displayed, under the action of DBAT with the known details of the missing tool. The user can then decide whether to temporarily replace the missing tool with another one or to permanently substitute another. Tool loss may occur by a missing or broken access route/path or, for example, where a removable medium such as a floppy disk is currently not accessible. Objects can be moved on and off a network, but this may often involve the removal of a whole application, all its dependent processes etc.

The virtual processor described above is an imaginary processor used to construct portable "executable" code. As described above, the output of VP compatible assemblers and compilers does not require linking due to the extremely late binding system which uses DBAT.

An 'executable' in VP code is processed by DBAT to its host target processor at load time before control is passed to the code. The VP has a 16 by 32 bit register set with an assumed 32 bit linear address space, but not limited to 16. Registers RO to R15 are completely general purpose. Registers such as an IP, segment pointers, flags, etc are assumed, that is, they are implemented as necessary by the target processor. VP code is designed to be extremely simple to 'translate' to a modern target processor, regardless of operating philosonhy. Other word sized processors than 32 bit ones can be handled easily. VP register set usage is not removed in the final target executable code. The register set is often implemented in memory (called ghost registers) with the target register set being used as required to implement the VP operation set on the memory registers. This pseudo interpretation of VP coding by a native processor may have a slight speed disadvantage for some processors, but many benefits overall. Processors with cached or fast memory (such as the transputer) can actually show a performance increase, particularly where the native register set is very small, as in the transputer. Task switching times are extremely fast using this scheme since the state of the native processor can be ignored, with the exception of a memory write to save the position of an outgoing task's register set, and memory read to restore the register position of the incoming task. The transputer architecture makes even this unnecessary. Some embodiments may have a simple version of DBAT that does not convert VP coding to native coding. These use VP macros that are complied by a target processor macro assembler into target executables. However certain constructs, such as references to tools, objects, etc, are retained for processing and fixup by DBAT. Industry standard target macro assemblers are perfectly suitable for this conversion.

The efficiency of code ultimately run on a target processor is dependent on the two stages of compilation and assembly by the VP compiler and DBAT respectively. The ability of a compiler to reduce the VP output to it's most efficient form is not hampered, but obviously little or no peephole optimisation can take place. DBAT performs peephole optimisations on the final code produced primarily by removing redundant native register/ghost register movements that can be produced by some sequences of VP codes.

On transputers, VP ghost registers can result in equal or better performance than traditional register use. Ghost registers are placed in on-chip RAM on transputers, effectively producing a 'data cache' for all processes running. Up to 48 processes can use on-chip memory ghost registers on an Inmos T800 transputer. Further processes require space in off-chip memory.

The system described may include a graphical user interface for operating using windows, mice, and the like. Windows can be displaced, with respect to a display means, and operated on, or their contents operated on, by means of a mouse, keyboard, or other input means.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A data processing system comprising:
   one or more data processors having a local memory and executing coded instructions written in a program code language native to that data processor; and
   a store containing a collection of independent program code segments available to and shared by all the data processors in the system if more than one, the program code segments being written for a virtual processor using a predefined, virtual processor program code language different from the native program code language of the or each of the data processors, each independent program code segment in the collection constituting an individual program tool individually selectable and individually loadable, independent of other program code segments in the collection, into the local memory of each data processor for the purpose of executing data processing tasks allocated to that processor;
   the one or more data processors each including:
      a selector individually selecting from the collection of independent program code segments only specific ones of the program code segments from the collection required by the data processor for the execution of a current task allocated to the data processor;
      a loader individually loading only the selected program code segments from the collection into the local memory of the data processor;
      a translator translating the selected program code segments from the virtual processor program code language into the native program code language of the data processor in question to provide a plurality of translated program code segments; and
      a binder binding the translated program code segments into an executable task to be performed by the data processor,
   wherein only the selected program code segments required for execution of the task are translated and bound into the executable task just at the time of loading the selected program code segments into the local memory of the data processor or during the execution of the task by the data processor.

2. A system as claimed in claim 1, wherein the binder receives a message commanding execution of a task, determines those program code segments not stored in the local memory which are required for execution of the commanded task, and retrieves those determined program code segments, and wherein the translator translates the retrieved program code segment and stores the translated program code segments in the local memory.

3. A system as claimed in claim 2, wherein the binder employs a usage flag corresponding to each translated program code segment, the usage flag being incremented when the corresponding program code segment is referenced by a task and decremented when the corresponding program code segment is de-referenced by a task, and inhibits removal of the translated program code segment from the local memory when the corresponding usage flag indicates usage of the respective translated program code segment.

4. A system as claimed in claim 2, wherein the collection of program code segments includes a kernel of process objects and a group of tool objects, and where each of the tool objects may be called by one or more of the process objects to act upon selected data.

5. A system as claimed in claim 1, wherein the data processor is one of a plurality of data processors connected as nodes in a network of processors that parallel process allocated tasks, the collection of independent program code segments being common to and shared by all the processors in the system at the same time.

6. A system as claimed in claim 5, wherein the data processors are of different types and operate using a respective one of several different native program code languages, wherein the virtual processor program code language is common to the system, and wherein the translator of each data processor translates selected program code segments from the common virtual program code processor language to the respective program code language of that data processor.

7. A data processing system comprising:
a plurality of data processors connected as nodes in a network of processors performing data processing tasks in parallel, each processor having a local memory and executing coded instructions written in a program code language native to that data processor; and
a store containing a collection of independent program code segments available to and shared by all the data processors in the system, the program code segments being written for a virtual processor using a predefined virtual processor program code language different from the native program code language of the data processors in the system, each independent program code segment constituting an individual program tool individually selectable and individually loadable, independent of other program code segments in the collection, into the local memory of each respective data processor for the purpose of executing data processing tasks allocated to that data processor;
each of the data processors including:
a selector individually selecting from the collection of independent program code segments only specific ones of the code segments required by the data processor for the execution of a current task allocated to the data processor;
a loader individually loading only the selected code segments from the collection to the local memory of the processor;
a translator translating the selected program code segments from the virtual processor program code language into the native program code language of the data processor in question to provide a plurality of translated program code segments; and
a binder binding the translated program code segments into the executable task to be performed by the data processor;
wherein only the selected program code segments required for execution of the task are translated and bound into the executable task just at the time of loading the selected program code segments into the local memory of the data processor or during the execution of the task by the data processor, and
wherein the network performs an allocation process in which each of the data processors in the network, upon being allocated a process, decides at the time that the process is allocated whether that one processor or a neighboring processor in the network is better able at that process allocation time to perform the process, and if the one processor decides that the one processor is better able at that process allocation time to perform the process than any of the neighboring processors, the one processor performs the process, and if the one processor decides that one of the neighboring processors is better able at that process allocation time to perform the process, the one processor reallocates the process to the one neighboring processor.

8. A system as claimed in claim 7, wherein in the allocation process:
the one processor determines a rating of itself representing its own ability at that process allocation time to perform the process, compares that rating with corresponding ratings obtained from its neighboring processors to determine which of the processors has the highest rating, and allocates the process to the neighboring processor having the highest rating unless the one processor has the highest rating, in which case, the one processor performs the process.

9. A system as claimed in claim 8, wherein if the one processor and at least one of said neighboring processors have equal highest ratings, the one processor performs the process.

10. A system as claimed in claim 8, wherein the rating of each processor is determined from the number of processes currently operating on that processor.

11. A system as claimed in claim 10, wherein said rating of each processor is determined from an effective-operations-per-second rating of that processor divided by the number of processes running at that processor multiplied by a function of off-chip communication speed available to that processor.

12. A system as claimed in claim 7, wherein said rating of each processor is determined from an available amount of local memory of that processor.

13. A system as claimed in claim 7, wherein if the one processor allocates the process to a neighboring processor, that neighboring processor repeats the allocation process to decide whether that neighboring processor should perform the process or reallocate the process to another neighboring processor.

14. A system as claimed in claim 7, wherein the one processor allocates the process to the neighboring processor by providing the neighboring processor with a number of bytes required, a name of the process, and an address at which the process is currently stored.

15. A system as claimed in claim 7, wherein information relating to the ability of the processors to perform processes is added to other messages passed between the processors.

16. A system as claimed in claim 7, wherein information relating to the ability of the processors to perform processes is passed between pairs of processors at adjacent nodes when no other information is being passed between those processors.

17. A data processing system comprising:
a plurality of data processors, connected as nodes in a network, performing parallel processing tasks allocated to those processors, each processor having a local memory and executing coded instructions written in a program code language native to that data processor; and a store containing a collection of independent program code segments available to and shared by all the data processors in the system, each code segment constituting an individual program tool individually selectable and individually loadable, independent of other program code segments in the collection, into the local memory of each respective data processor, and bindable when so loaded with other individual selected and individually loaded program tools to form a task executable jointly by two or more of those processors, each of the data processors includes:

a selector individually selecting from the collection of independent program code segments only specific ones of the program code segments from the collection required by the data processor for the joint execution of a current task jointly allocated to the data processor and another data processor in the network;

a loader individually loading only the selected program code segments from the collection into the local memory of the data processor; and  a binder binding only the individually selected program code segments into the task to be jointly executed by the data processor and another data processor, the selected program code segments being bound into a task executable jointly by both data processors only at the time of loading the selected code segments into the local memory of both data processors or during execution of the task by both data processors.

18. A method of processing data in an electronic data processor executing coded instructions written in a program code language native to that data processor, comprising the steps of:

providing a collection of independent program code segments written for a virtual processor using a predefined virtual processor program code language different from the native program code language of the data processor, each of the independent code segments in the collection constituting an individual program tool individually selectable and individually loadable, independent of other program code segments in the collection, into the local memory of the data processor, and bindable when so loaded with other such individually selected and loaded tools to form a task executable by the processor;

instructing the data processor to execute a task;

electronically selecting from the collection of independent code segments only specific ones of the program code segments required by the processor to perform the task;

electronically loading only the selected program code segments into the local memory of the processor;

electronically translating the selected code segments from the virtual processor program code language into the native program code language of the data processor;

binding the translated program code segments into a task executable by the data processor; and  executing the task in accordance with the translated and bound code segments,  wherein the translating and binding of only the selected code segments required for execution of the task into the executable task takes place just at the time of loading the selected program code segments into the local memory of the data processor or at the time of execution of the task by the data processor.

19. A method of processing data in a data processing system including a plurality of electronic data processors each having a local memory and executing coded instructions written in its own native program code language, the data processors performing processes in parallel, comprising the steps of:

providing a collection of independent program code segments accessible to and shared by all the data processors in the system and enabling the data processors to perform data processing tasks allocated to them, each program code segment constituting an individual program tool individually selectable and individually loadable, independent of other program code segments in the collection, into the local memory of a respective one of the processors, and bindable by the one processor with other such individually selected and individually loaded program tools to form a task executable jointly by two or more of those processors;

instructing two or more of the data processors jointly to perform a task;

selecting from the collection of independent program code segments only those program code segments needed by the two or more data processors for the joint execution of an allocated task;

loading the selected program code segments into the respective local memories of the two or more data processors;

binding the selected program code segments into a task executable by the data processors and in accordance with the jointly allocated task; and  the two or more data processors jointly executing the task;

where the binding of the selected code segments into the task executable jointly by the two or more data processors takes place only at the time of loading the selected program code segments into the respective local memories of the two or more processors or during execution of the task by the two or more data processors.

\* \* \* \* \*